US012735035B2

(12) United States Patent
Kamijo

(10) Patent No.: US 12,735,035 B2
(45) Date of Patent: Sep. 15, 2026

(54) VEHICLE CONTROL DEVICE, VEHICLE CONTROL METHOD, AND STORAGE MEDIUM

(71) Applicant: TOYOTA JIDOSHA KABUSHIKI KAISHA, Toyota (JP)

(72) Inventor: Kentaro Kamijo, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 48 days.

(21) Appl. No.: 19/055,954

(22) Filed: Feb. 18, 2025

(65) Prior Publication Data

US 2025/0263073 A1 Aug. 21, 2025

(30) Foreign Application Priority Data

Feb. 20, 2024 (JP) ................................ 2024-023378

(51) Int. Cl.
*B60W 30/14* (2006.01)
*B60W 30/18* (2012.01)
*B60W 50/00* (2006.01)

(52) U.S. Cl.
CPC .... *B60W 30/143* (2013.01); *B60W 30/18159* (2020.02); *B60W 50/0097* (2013.01); *B60W 2520/105* (2013.01); *B60W 2555/60* (2020.02)

(58) Field of Classification Search
CPC ......... B60W 30/143; B60W 30/18159; B60W 50/0097; B60W 2555/60; B60W 2520/105
See application file for complete search history.

(56) References Cited

U.S. PATENT DOCUMENTS 8,255,110 B2 8/2012 Taguchi
8,364,394 B2 1/2013 Taguchi
8,428,812 B2 4/2013 Taguchi
8,660,778 B2 2/2014 Taguchi
9,067,571 B2 6/2015 Matsunaga
9,096,266 B2 8/2015 Irie
9,352,779 B2 5/2016 Kindo et al.
9,886,852 B2 2/2018 Urano
10,048,699 B2 8/2018 Inoue et al.
(Continued)

FOREIGN PATENT DOCUMENTS

JP 2017088161 A 5/2017

*Primary Examiner* — Michael D Lang
(74) *Attorney, Agent, or Firm* — Hunton Andrews Kurth LLP

(57) ABSTRACT

A vehicle control device that controls traveling of a vehicle at a roundabout in which a plurality of connected roads is connected to a circular road, acquires a traveling route of the vehicle including an exit road that is a connected road to which the vehicle is to exit from the circular road, acquires speed limits of the circular road and the exit road, calculates a target vehicle speed when the vehicle exits to the exit road from the circular road based on the speed limits, calculates an acceleration necessary period or an acceleration necessary distance necessary for accelerating the vehicle to the target vehicle speed based on current vehicle speed of the vehicle traveling on the circular road and the target vehicle speed, and starts acceleration control of accelerating the vehicle at predetermined acceleration when the calculated acceleration necessary period or acceleration necessary distance satisfies a predetermined start condition.

5 Claims, 4 Drawing Sheets

(56) References Cited

U.S. PATENT DOCUMENTS

| | | | | |
|---|---|---|---|---|
| 2017/0120910 | A1 | 5/2017 | Schubert et al. | |
| 2020/0348682 | A1 | 11/2020 | Kamata | |
| 2021/0082297 | A1* | 3/2021 | Jacobus ................ | B60W 10/04 |

* cited by examiner

VEHICLE CONTROL DEVICE, VEHICLE CONTROL METHOD, AND STORAGE MEDIUM

CROSS-REFERENCE TO RELATED APPLICATION

This application claims priority to Japanese Patent Application No. 2024-023378 filed on Feb. 20, 2024, incorporated herein by reference in its entirety.

BACKGROUND

1. Technical Field

The present disclosure relates to a vehicle control device, a vehicle control method, and a storage medium.

2. Description of Related Art

For example, Japanese Unexamined Patent Application Publication No. 2017-088161 discloses a technique of, in a vehicle including a control device capable of executing adaptive cruise control (ACC), accelerating the vehicle during exit from a roundabout (traffic circle) while keeping substantially constant speed of the vehicle between entry of the roundabout and change in direction to exit from the roundabout.

SUMMARY

With the technique of JP 2017-088161 A, it is determined whether the vehicle will exit from a roundabout based on traveling dynamics quantity (a yaw rate or a steering angle). Thus, for example, when the vehicle changes a lane during traveling in the roundabout, it may be erroneously determined that the vehicle will exit from the roundabout, which may cause unnecessary acceleration. Further, with the technique of JP 2017-088161 A, target vehicle speed set in ACC is used as target vehicle speed to which the vehicle is to be accelerated. Thus, if it is erroneously determined that the vehicle will exit from the roundabout early, the vehicle may also be accelerated exceeding a speed limit in the roundabout.

The present disclosure has been made to solve the above problem and is directed to effectively prevent unnecessary acceleration when a vehicle exits from a roundabout.

A vehicle control device of the present disclosure is a vehicle control device that controls traveling of a vehicle at a roundabout in which a plurality of connected roads is connected to a circular road, wherein the vehicle control device acquires a traveling route of the vehicle including the circular road and an exit road that is a connected road to which the vehicle is to exit from the circular road among a plurality of the connected roads, acquires speed limits of the circular road and the exit road, calculates a target vehicle speed when the vehicle exits from the circular road to the exit road based on the speed limits, calculates an acceleration necessary period or an acceleration necessary distance necessary for accelerating the vehicle to the target vehicle speed based on current vehicle speed of the vehicle that is traveling on the circular road and the target vehicle speed, and starts acceleration control of accelerating the vehicle at predetermined acceleration when the calculated acceleration necessary period or the calculated acceleration necessary distance satisfies a predetermined start condition.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A vehicle control device according to the present embodiment will be described below with reference to the drawings.

Hardware Configuration

Figure 1:
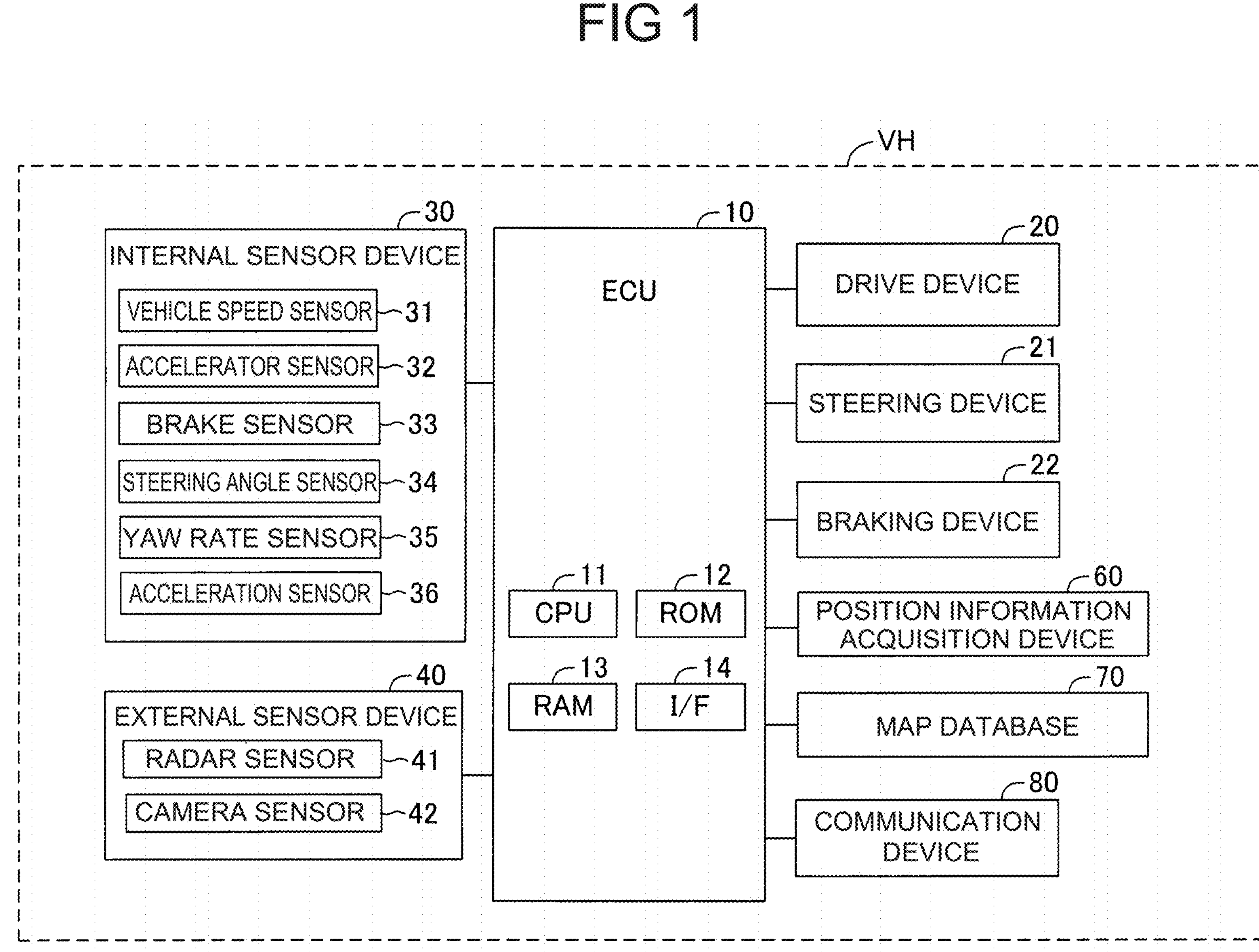
FIG. 1 is a schematic view illustrating a hardware configuration of a vehicle according to the present embodiment.

FIG. 1 is a schematic view illustrating a hardware configuration of a vehicle VH according to the present embodiment. Hereinafter, the vehicle VH will be sometimes referred to as an own vehicle when it is necessary to distinguish the vehicle from other vehicles, and the like.

The vehicle VH includes an electronic control unit (ECU) 10. The ECU 10 includes a central processing unit (CPU) 11, a read only memory (ROM) 12, a random access memory (RAM) 13, an interface device 14, and the like. The CPU 11 is a processor that executes various kinds of programs stored in the ROM 12. The ROM 12, which is a non-volatile memory (storage medium), stores data, and the like, necessary for the CPU 11 to execute various kinds of programs. The RAM 13, which is a volatile memory, provides a work area to which various kinds of programs are loaded when the various kinds of programs are executed by the CPU 11. The interface device 14 is a communication device for communicating with an external device.

The ECU 10 is a device that is a center of performing driver assistance such as ACC. The driver assistance is a concept including autonomous driving. To the ECU 10, a drive device 20, a steering device 21, a braking device 22, an internal sensor device 30, an external sensor device 40, a position information acquisition device 60, a map database 70, a communication device 80, and the like, are communicably connected.

The drive device 20 generates driving force to be transmitted to a drive wheel of the vehicle VH. Examples of the drive device 20 can include an electric motor and an engine. In the present device, the vehicle VH may be any of a hybrid electric vehicle (HEV), a plug-in hybrid electric vehicle (PHEV), a fuel cell electric vehicle (FCEV), a battery electric vehicle (BEV) or an engine vehicle. The steering device 21 provides steering force to wheels of the vehicle VH. The braking device 22 provides braking force to the wheels of the vehicle VH.

The internal sensor device 30 includes sensors that acquire states of the vehicle VH. The internal sensor device 30 includes a vehicle speed sensor 31, an accelerator sensor 32, a brake sensor 33, a steering angle sensor 34, a yaw rate sensor 35, an acceleration sensor 36, and the like.

The vehicle speed sensor 31 detects traveling speed (vehicle speed Vs) of the vehicle VH. The accelerator sensor 32 detects an operation amount of an accelerator pedal (not illustrated) by a driver. The brake sensor 33 detects an operation amount of a brake pedal (not illustrated) by the driver. The steering angle sensor 34 detects a rotation angle (steering angle) of a steering wheel or a steering shaft (not illustrated). The yaw rate sensor 35 detects a yaw rate of the vehicle VH. The acceleration sensor 36 detects acceleration of the vehicle VH. The internal sensor device 30 transmits to the ECU 10, states of the vehicle VH detected by the respective sensors 31 to 36 at predetermined intervals.

The external sensor device 40 includes sensors that recognize object information regarding an object around the vehicle VH. The external sensor device 40 includes a radar sensor 41, a camera sensor 42, and the like. Here, examples of the object information can include a peripheral vehicle, a white line of a road, and a road sign.

The radar sensor 41 detects an object existing around the vehicle VH. The radar sensor 41 includes a millimeter-wave radar, and/or a lidar. The millimeter-wave radar radiates a radio wave in a millimeter-wave band and receives a millimeter wave reflected by an object existing within a radiation range. The millimeter-wave radar acquires a relative distance, relative speed, and the like, between the vehicle VH and the object based on a phase difference between the transmitted millimeter wave and the received reflected wave, an attenuation level of the reflected wave, a period from when the millimeter wave is transmitted until when the reflected wave is received, and the like. The lidar acquires a shape of an object detected around the vehicle VH, a relative distance, relative speed, and the like, between the vehicle VH and the object by sequentially performing scanning with pulsed laser light having a shorter wavelength than a wavelength of a millimeter wave toward a plurality of directions and receiving reflected light reflected by the object.

The camera sensor 42 captures an image of a circumference of the vehicle VH and processes the captured image data to thereby acquire object information around the vehicle VH. As the camera sensor 42, for example, a digital camera having an imaging element such as a CMOS and a CCD can be used. The object information is information representing a type of an object detected around the vehicle VH, a relative distance, relative speed, and the like, between the vehicle VH and the object. It is only necessary to recognize the type of the object through, for example, machine learning such as pattern matching.

The external sensor device 40 repeatedly transmits the acquired object information to the ECU 10 every time a predetermined period elapses. Note that the external sensor device 40 does not necessarily have to include both the radar sensor 41 and the camera sensor 42 and may include, for example, only the radar sensor 41 or only the camera sensor 42.

The position information acquisition device 60 acquires current position information of the vehicle VH. As the position information acquisition device 60, for example, a global positioning system (GPS), a global navigation satellite system (GNSS), and the like, provided in a navigation system (not illustrated) can be used. The position information acquisition device 60 transmits the acquired current position information of the vehicle VH to the ECU 10 at predetermined intervals.

The map database 70, which is a database of map information, is stored in a storage device (such as a hard disk and a flash memory) provided in the vehicle VH. The map information includes a position of an intersection on a road, and the like. Note that the map database 70 may be stored in an external server that can communicate with the vehicle VH. In this case, the vehicle VH only requires to acquire the map information from the external server through the communication device 80.

The communication device 80 performs V2X communication. Specifically, the communication device 80 performs vehicle to infrastructure (V2I) communication between the own vehicle VH and an infrastructure. The communication device 80 can acquire information around the own vehicle VH through the V2X communication. Examples of the information around the own vehicle VH can include a position of an intersection, and the like. The communication device 80 transmits the acquired information around the own vehicle VH to the ECU 10 at predetermined intervals.

Software Configuration

Figure 2:
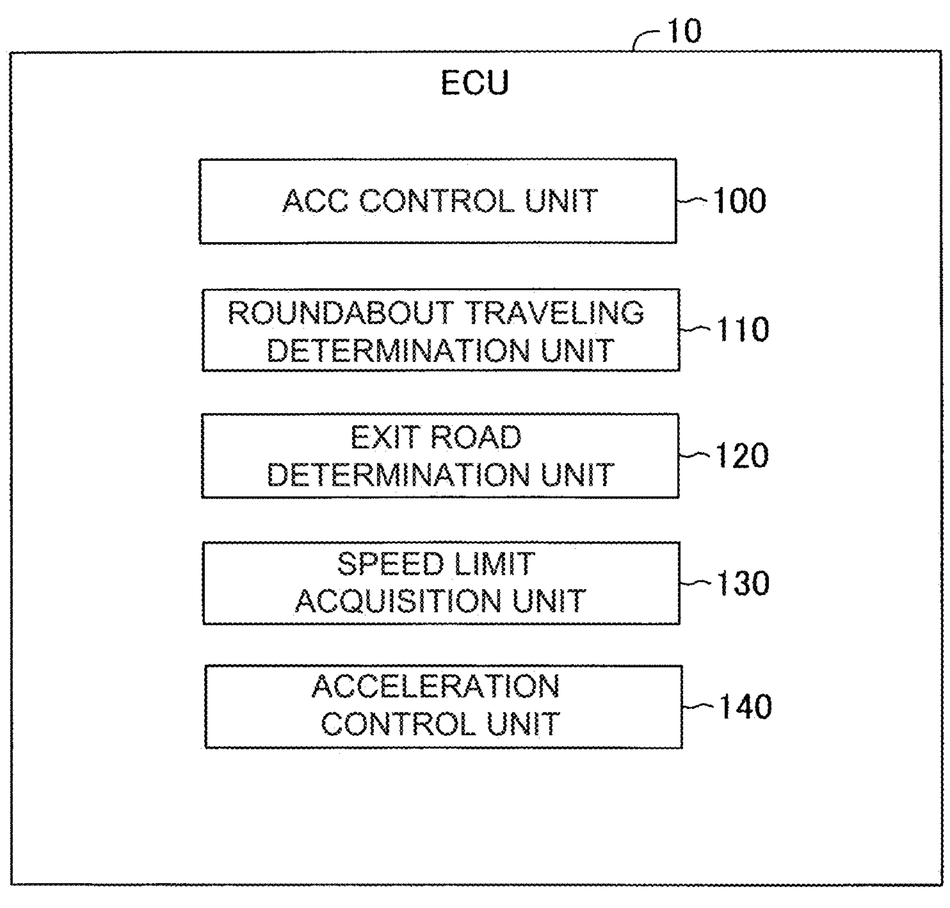
FIG. 2 is a schematic view illustrating a software configuration of a control device according to the present embodiment.

FIG. 2 is a schematic view illustrating a software configuration of a control device according to the present embodiment.

As illustrated in FIG. 2, the ECU 10 includes an ACC control unit 100, a roundabout traveling determination unit 110, an exit road determination unit 120, a speed limit acquisition unit 130, an acceleration control unit 140, and the like, as functional components. These functional components 100 to 140 are implemented by the CPU 11 of the ECU 10 reading programs stored in the ROM 12 to the RAM 13 and executing the programs. Note that all or some of the functional components 100 to 140 may be provided in other ECUs different from the ECU 10 or an information processing device in a facility (such as a management center) that can communicate with the vehicle VH.

The ACC control unit 100 executes ACC based on set vehicle speed or a set inter-vehicle distance. The ACC is well known, and thus will be simply described below. The ACC includes two types of control of constant-speed traveling control and following traveling control. The constant-speed traveling control is control for causing the vehicle VH to travel at constant speed in accordance with the set vehicle speed. The following traveling control is control for causing the own vehicle VH to follow a preceding vehicle that is traveling ahead of the own vehicle VH such that an inter-vehicle distance between the preceding vehicle and the own vehicle VH becomes a set inter-vehicle distance.

The ACC control unit 100 detects a preceding vehicle that becomes a following target, ahead of the own vehicle VH based on the detection result of the external sensor device 40. The ACC control unit 100 executes constant-speed traveling control when a preceding vehicle that becomes a following target does not exist. In this case, the ACC control unit 100 controls actuation of the drive device 20 and the braking device 22 based on target acceleration obtained from deviation between vehicle speed Vs and the set vehicle speed. It is only necessary to acquire the vehicle speed Vs based on the detection result of the vehicle speed sensor 31. On the other hand, when a preceding vehicle that becomes a following target exists ahead of the own vehicle VH, the ACC control unit 100 executes following traveling control. In this case, the ACC control unit 100 controls actuation of the drive device 20 and the braking device 22 based on target acceleration obtained from deviation between an actual inter-vehicle distance and the set inter-vehicle distance. It is only necessary to acquire the inter-vehicle distance between the own vehicle VH and the preceding vehicle based on the detection result of the external sensor device 40.

The roundabout traveling determination unit 110 determines whether the vehicle VH is traveling at a roundabout during execution of the ACC by the ACC control unit 100. Here, the roundabout refers to an intersection at which a plurality of roads is connected to a circular road and is also referred to as a traffic circle. Hereinafter, roads connected to the circular road will be referred to as "connected roads". The roundabout traveling determination unit 110 executes determination as to whether the vehicle VH is traveling on the circular road of the roundabout in a state where the map information in the map database 70 is available, and when a traveling route is set by the navigation system. The state where the map information is available refers to a state where at least the position information acquisition device 60 can acquire current position information of the vehicle VH (for example, a state where the vehicle VH is not traveling at a place where a GPS signal cannot be received such as inside a tunnel).

The roundabout traveling determination unit 110 determines that the vehicle VH is traveling on the circular road of the roundabout when the roundabout exists on the traveling route set by the navigation system, and when the current position information of the vehicle VH acquired by the position information acquisition device 60 substantially coincides with position information of the roundabout acquired based on the map information in the map database 70. Note that the position information of the roundabout may be acquired based on infrastructure information received by the communication device 80 through V2I communication. Further, when the external sensor device 40 recognizes a road sign, or the like, that indicates a roundabout, it may be determined that the vehicle VH is traveling on the circular road of the roundabout based on the recognition result.

The exit road determination unit 120 determines a connected road to which the vehicle VH is to exit from the circular road among the plurality of connected roads. Specifically, the exit road determination unit 120 determines the connected road to which the vehicle VH is to exit based on the traveling route set by the navigation system. Note that the technique of the present disclosure does not exclude determination of the connected road to which the vehicle VH is to exit based on driver operation information including blinking of a direction indicator, and the like.

The speed limit acquisition unit 130 acquires a speed limit of the circular road of the roundabout (hereinafter, referred to as a circular road speed limit $V_R$) on which the vehicle VH travels and a speed limit of the connected road (hereinafter, referred to as an after-exit speed limit $V_{Lim}$) to which the vehicle VH is to exit from the circular road. Specifically, the speed limit acquisition unit 130 acquires the circular road speed limit $V_R$ and the after-exit speed limit $V_{Lim}$ based on the map information in the map database 70. Note that the circular road speed limit $V_R$ and the after-exit speed limit $V_{Lim}$ may be acquired based on the infrastructure information, and the like, acquired by the communication device 80 through the V2I communication. Further, when the external sensor device 40 recognizes a road sign, or the like, indicating an upper speed limit, the circular road speed limit $V_R$ and the after-exit speed limit $V_{Lim}$ may be acquired based on the recognition result.

In the present embodiment, the ACC control unit 100 executes deceleration control of decelerating the vehicle VH when the set vehicle speed of the ACC is higher than the circular road speed limit $V_R$ when the vehicle VH is caused to enter the circular road of the roundabout. Further, the ACC control unit 100 executes acceleration control of accelerating the vehicle VH when the after-exit speed limit $V_{Lim}$ is higher than the circular road speed limit $V_R$ when the vehicle VH is caused to exit to the connected road from the circular road of the roundabout. Hereinafter, the acceleration control to be executed by the acceleration control unit 140 will be described in detail.

Acceleration Control

Figure 3:
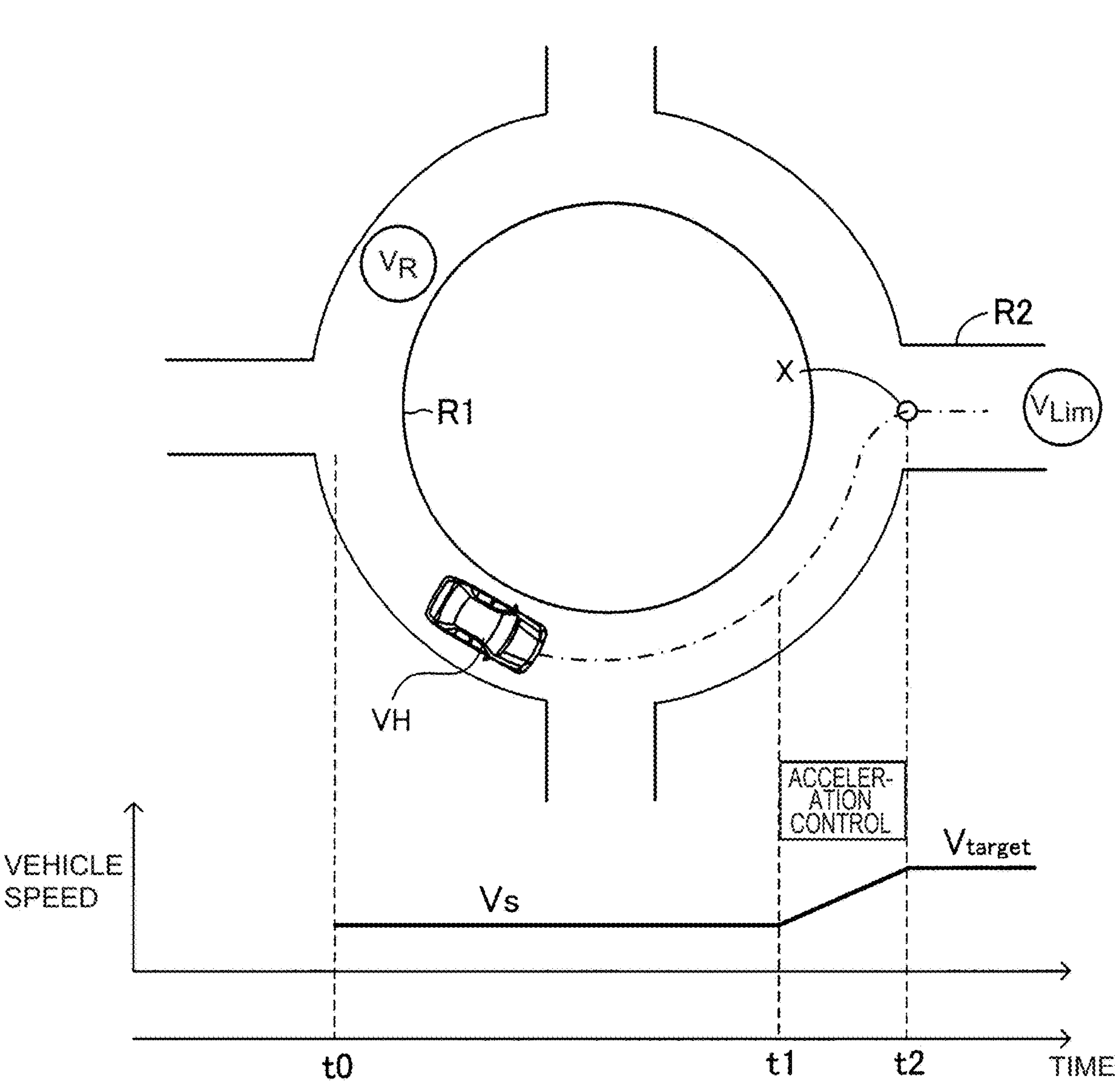
FIG. 3 is a schematic view for explaining acceleration control according to the present embodiment.

The acceleration control unit 140 executes acceleration control of accelerating the vehicle VH before the vehicle VH exits from the circular road when a preceding vehicle that becomes a following target of the ACC does not exist ahead of the own vehicle VH and when the after-exit speed limit $V_{Lim}$ is higher than the circular road speed limit $V_R$ while the vehicle VH is traveling on the circular road of the roundabout. FIG. 3 is a schematic view for explaining the acceleration control according to the present embodiment. FIG. 3 illustrates a circular road R1 on which the vehicle VH is traveling, and a connected road R2 to which the vehicle VH is to exit. Further, FIG. 3 illustrates a connection portion X between the circular road R1 and the connected road R2, that is, an exit portion.

When the vehicle VH enters the circular road R1 (see time to in FIG. 3), the acceleration control unit 140 calculates exit target vehicle speed $V_{target}$ that is target vehicle speed when the vehicle VH reaches the exit portion X. As one example, the acceleration control unit 140 calculates the exit target vehicle speed $V_{target}$ based on a minimum function (Min $V_{target}(V_R, V_{Lim})$) of the circular road speed limit $V_R$ and the after-exit speed limit $V_{Lim}$. When the exit target vehicle speed $V_{target}$ is obtained, the acceleration control unit 140 calculates a period necessary for accelerating the vehicle VH to the exit target vehicle speed $V_{target}$ (hereinafter, an acceleration necessary period Tr) when the vehicle VH is accelerated from the current vehicle speed Vs at predetermined acceleration A. The acceleration necessary period Tr can be obtained by dividing a difference between the exit target vehicle speed $V_{target}$ and the current vehicle speed Vs by the acceleration A ($Tr=(V_{target}-Vs)/A$). Further, when the acceleration necessary period Tr is obtained, the acceleration control unit 140 calculates a distance necessary for accelerating the vehicle VH to the exit target vehicle speed $V_{target}$ from the current vehicle speed Vs (hereinafter, referred to as an acceleration necessary distance Dr). The acceleration necessary distance Dr can be obtained by multiplying a difference between the exit target vehicle speed $V_{target}$ and the current vehicle speed Vs by the acceleration necessary period Tr ($Dr=(V_{target}-Vs)\times Tr$).

The acceleration control unit 140 calculates a period until when the vehicle VH reaches the exit portion X (hereinafter, referred to as a predicted reaching period T) when the vehicle VH travels at the current vehicle speed Vs and a distance until when the vehicle VH reaches the exit portion X from a current position (hereinafter, referred to as a predicted reaching distance D). It is only necessary to acquire the current vehicle speed Vs of the vehicle VH based on the detection result of the vehicle speed sensor 31 and acquire the current position of the vehicle VH based on the detection result of the position information acquisition device 60. The position information of the exit portion X may be acquired based on the map information in the map database 70 or may be acquired based on the detection result of the external sensor device 40.

The acceleration control unit 140 starts acceleration control of accelerating the vehicle VH at predetermined acceleration A (see time t1 in FIG. 3) when an acceleration start condition that satisfies the following first condition and second condition is satisfied.

First condition: when the acceleration necessary period Tr becomes equal to or longer than the predicted reaching period T (Tr≥T).

Second condition: when the acceleration necessary distance Dr becomes equal to or less than the predicted reaching distance D (Dr≤D).

The acceleration control unit 140 ends the acceleration control (see time t2 in FIG. 3) when the vehicle speed Vs of the vehicle VH reaches the exit target vehicle speed $V_{target}$ or an end condition that the driver performs override operation of depressing an accelerator pedal is satisfied after the acceleration control is started as a result of the first condition and the second condition being satisfied. When the acceleration control unit 140 ends the acceleration control, control is restored to normal ACC by the ACC control unit 100 thereafter.

Figure 4:
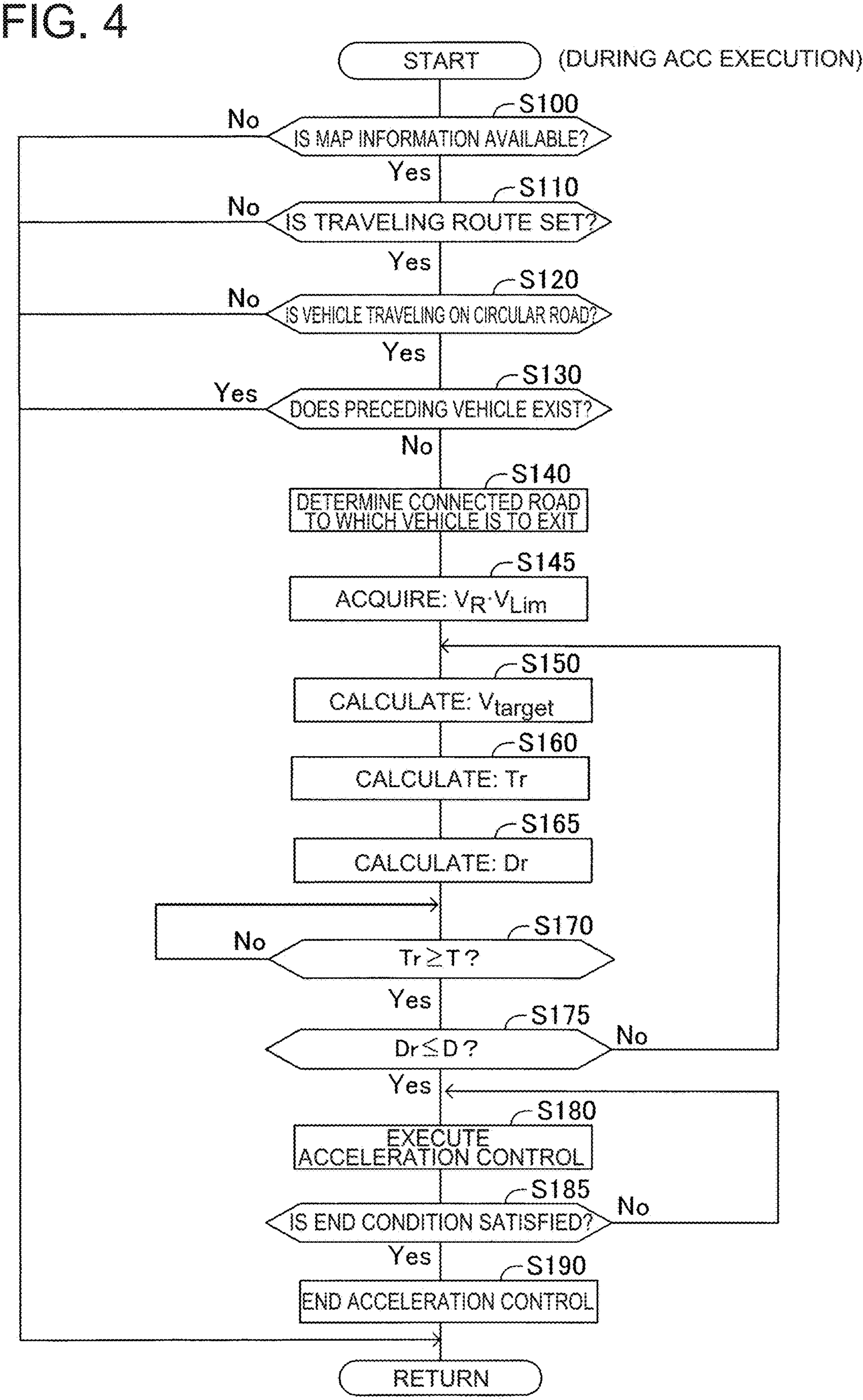
FIG. 4 is a flowchart for explaining a routine of processing of the acceleration control according to the present embodiment.

FIG. 4 is a flowchart for explaining a routine of processing of the acceleration control to be executed by the CPU 11 of the ECU 10. The present routine is started by execution of the ACC.

In step S100, the ECU 10 determines whether the map information in the map database 70 is available. When the map information is available (Yes), the ECU 10 causes the processing to proceed to step S110. On the other hand, when the map information is not available (No), the ECU 10 returns the present routine.

In step S110, the ECU 10 determines whether a traveling route is set by the navigation system. When the traveling route is set by the navigation system (Yes), the ECU 10 causes the processing to proceed to step S120. On the other hand, when the traveling route is not set by the navigation system (No), the ECU 10 returns the present routine. Note that order of the processing in step S100 and the processing in step S110 is random, and the processing may be performed at the same time.

In step S120, the ECU 10 determines whether the vehicle VH is traveling on a circular road of a roundabout. Specifically, the ECU 10 determines that the vehicle VH is traveling on the circular road of the roundabout when the roundabout exists on the traveling route set by the navigation system, and when the current position information of the vehicle VH acquired by the position information acquisition device 60 substantially coincides with position information of the roundabout acquired based on the map information in the map database 70. When it is determined that the vehicle VH is traveling on the circular road of the roundabout (Yes), the ECU 10 causes the processing to proceed to step S130. On the other hand, when it is determined that the vehicle VH is not traveling on the circular road of the roundabout (No), the ECU 10 returns the present routine.

In step S130, the ECU 10 determines whether a preceding vehicle that becomes a following target exists ahead of the own vehicle VH based on the detection result of the external sensor device 40. When a preceding vehicle does not exist (No), the ECU 10 causes the processing to proceed to step S140. On the other hand, when a preceding vehicle exists (Yes), the ECU 10 returns the present routine.

In step S140, the ECU 10 determines a connected road to which the vehicle VH is to exit from the circular road. Then, in step S145, the ECU 10 acquires the circular road speed limit $V_R$ and the after-exit speed limit $V_{Lim}$.

In step S150, the ECU 10 calculates the exit target vehicle speed $V_{target}$ based on a minimum function of the circular road speed limit $V_R$ and the after-exit speed limit $V_{Lim}$. Then, in step S160, the ECU 10 calculates the acceleration necessary period Tr necessary for accelerating the vehicle VH to the exit target vehicle speed $V_{target}$ when the vehicle VH is accelerated at predetermined acceleration A from the current vehicle speed Vs. Further, in step S165, the ECU 10 calculates the acceleration necessary distance Dr necessary for accelerating the vehicle VH to the exit target vehicle speed $V_{target}$ from the current vehicle speed Vs.

In step S170, the ECU 10 determines whether the first condition that the acceleration necessary period Tr becomes equal to or longer than the predicted reaching period T is satisfied. When the first condition is satisfied (Yes), the ECU 10 causes the processing to proceed to step S175. On the other hand, when the first condition is not satisfied (No), the ECU 10 returns the processing to step S170.

In step S175, the ECU 10 determines whether the second condition that the acceleration necessary distance Dr becomes equal to or less than the predicted reaching distance D is satisfied. When the second condition is satisfied (Yes), the ECU 10 causes the processing to proceed to step S180. On the other hand, when the second condition is not satisfied (No), the ECU 10 returns the processing to step S150.

In step S180, the ECU 10 executes the acceleration control of accelerating the vehicle VH at predetermined acceleration A. Then, in step S185, the ECU 10 determines whether the end condition of the acceleration control is satisfied. When the end condition is satisfied (Yes), specifically, the vehicle speed Vs of the vehicle VH reaches the exit target vehicle speed $V_{target}$ or when the driver performs override operation of depressing the accelerator pedal, the ECU 10 causes the processing to proceed to step S190, ends the acceleration control and returns the present routine. In other words, control is restored to normal ACC. On the other hand, when the end condition is not satisfied (No), the ECU 10 returns the processing to step S180 and continues the acceleration control.

According to the present embodiment described in detail above, the ECU 10 determines the connected road R2 to which the vehicle VH is to exit from the circular road R1 based on the traveling route set by the navigation system. This can prevent erroneous determination (such as, for example, lane change, or the like, being erroneously determined as exit) that is made when exit determination from the circular road R1 is made based on a yaw rate, a steering angle, or the like, and can effectively prevent unnecessary acceleration of the vehicle VH in the circular road R1.

Further, the ECU 10 acquires a speed limit of the connected road R2 (after-exit speed limit $V_{Lim}$) to which the vehicle VH is to exit based on the map information in the map database 70 and sets the exit target vehicle speed $V_{target}$ based on the acquired after-exit speed limit $V_{Lim}$. Then, the ECU 10 is configured to calculate the acceleration necessary period Tr and the acceleration necessary distance Dr necessary for the vehicle speed Vs of the vehicle VH to reach the exit target vehicle speed $V_{target}$ and determine an optimal start timing of the acceleration control based on the calculated acceleration necessary period Tr and acceleration necessary distance Dr. This can effectively prevent the vehicle VH from accelerating exceeding the speed limit in the circular road R1 while implementing prompt acceleration suited for the sense of the driver when the vehicle VH exits from the circular road R1, and can reliably improve safety.

While the vehicle control device, the vehicle control method, and the storage medium according to the present embodiment have been described above, the present disclosure is not limited to the above embodiment and can be variously modified without deviating from the purpose of the present disclosure. For example, while the ACC has been described as one example in the above embodiment, the technique of the present disclosure can be also applied to a vehicle capable of executing only cruise control or an autonomous driving vehicle in which part or all of driving operation is autonomously performed.

What is claimed is:

1. A vehicle control device that controls traveling of a vehicle at a roundabout in which a plurality of connected roads is connected to a circular road, wherein the vehicle control device:

acquires a traveling route of the vehicle including the circular road and an exit road that is a connected road to which the vehicle is to exit from the circular road among a plurality of the connected roads;

acquires speed limits of the circular road and the exit road;

calculates a target vehicle speed when the vehicle exits from the circular road to the exit road based on the speed limits;

calculates an acceleration necessary period or an acceleration necessary distance necessary for accelerating the vehicle to the target vehicle speed based on current vehicle speed of the vehicle that is traveling on the circular road, and the target vehicle speed; and starts acceleration control of accelerating the vehicle at predetermined acceleration when the calculated acceleration necessary period or the calculated acceleration necessary distance satisfies a predetermined start condition.

2. The vehicle control device according to claim 1, wherein a predicted reaching period until the vehicle reaches an exit portion that is a connection portion of the circular road and the exit road and a predicted reaching distance until the vehicle reaches the exit portion are calculated, and the start condition is satisfied when the acceleration necessary period becomes equal to or longer than the predicted reaching period or the acceleration necessary distance becomes equal to or less than the predicted reaching distance.

3. The vehicle control device according to claim 1, wherein the target vehicle speed is calculated using a minimum function that employs a smaller value between the speed limit of the circular road and the speed limit of the exit road.

4. A vehicle control method of controlling traveling of a vehicle at a roundabout in which a plurality of connected roads is connected to a circular road, the vehicle control method comprising:

acquiring a traveling route of the vehicle including the circular road and an exit road that is a connected road to which the vehicle is to exit from the circular road among a plurality of the connected roads;

acquiring speed limits of the circular road and the exit road;

calculating target vehicle speed when the vehicle exits to the exit road from the circular road based on the speed limits;

calculating an acceleration necessary period or an acceleration necessary distance necessary for accelerating the vehicle to the target vehicle speed based on current vehicle speed of the vehicle that is traveling on the circular road and the target vehicle speed; and starting acceleration control of accelerating the vehicle at predetermined acceleration when the calculated acceleration necessary period or the calculated acceleration necessary distance satisfies a predetermined start condition.

5. A non-transitory storage medium storing a program that causes a computer of a vehicle control device that controls traveling of a vehicle at a roundabout in which a plurality of connected roads is connected to a circular road to execute processing of:

acquiring a traveling route of the vehicle including the circular road and an exit road that is a connected road to which the vehicle is to exit from the circular road among a plurality of the connected roads;

acquiring speed limits of the circular road and the exit road;

calculating target vehicle speed when the vehicle exits to the exit road from the circular road based on the speed limits;

calculating an acceleration necessary period or an acceleration necessary distance necessary for accelerating the vehicle to the target vehicle speed based on current vehicle speed of the vehicle that is traveling on the circular road and the target vehicle speed; and starting acceleration control of accelerating the vehicle at predetermined acceleration when the calculated acceleration necessary period or the calculated acceleration necessary distance satisfies a predetermined start condition.

* * * * *